(12) United States Patent
Rezende

(10) Patent No.: US 12,098,799 B2
(45) Date of Patent: Sep. 24, 2024

(54) HYBRID INSULATING COMPOUND FOR USE IN SYSTEMS REQUIRING HIGH POWER OF THERMAL INSULATION

(71) Applicant: NANOTECH, INC., Spring, TX (US)

(72) Inventor: Claudinei Calado Rezende, Spring, TX (US)

(73) Assignee: NANOTECH, INC., Katy, TX (US)

( * ) Notice: Subject to any disclaimer, the term of this patent is extended or adjusted under 35 U.S.C. 154(b) by 465 days.

(21) Appl. No.: 17/156,791

(22) Filed: Jan. 25, 2021

(65) Prior Publication Data
US 2022/0010915 A1 Jan. 13, 2022

Related U.S. Application Data

(60) Provisional application No. 63/050,969, filed on Jul. 13, 2020.

(51) Int. Cl.
*F16L 59/02* (2006.01)
*B01B 1/00* (2006.01)
*B01F 31/80* (2022.01)
*B82Y 40/00* (2011.01)

(52) U.S. Cl.
CPC ............ *F16L 59/028* (2013.01); *B01B 1/005* (2013.01); *B01F 31/80* (2022.01); *B82Y 40/00* (2013.01)

(58) Field of Classification Search
CPC ........ F16L 59/028; B01B 1/005; B01F 31/80; B82Y 40/00
See application file for complete search history.

(56) References Cited

U.S. PATENT DOCUMENTS

| | | |
|---|---|---|
| 5,130,184 A | 7/1992 | Ellis |
| 6,533,855 B1 | 3/2003 | Gaynor et al. |
| 2003/0150614 A1* | 8/2003 | Brown ................. E21B 27/02 166/117.6 |
| 2004/0101699 A1 | 5/2004 | Vassen et al. |
| 2005/0025952 A1 | 2/2005 | Field et al. |
| 2005/0126441 A1 | 6/2005 | Skelhorn |
| 2005/0159523 A1 | 7/2005 | Bremser et al. |

(Continued)

FOREIGN PATENT DOCUMENTS

| | | |
|---|---|---|
| CN | 101468907 B | 7/2009 |
| CN | 107399925 A | 11/2017 |

(Continued)

OTHER PUBLICATIONS

Berdahl et al., Preliminary survey of the solar reflectance of cool roofing materials, Elsevier, Energy and Buildings 25, 1997, pp. 149-158, USA.

(Continued)

*Primary Examiner* — Andrew J. Oyer
(74) *Attorney, Agent, or Firm* — Norton Rose Fulbright US LLP

(57) ABSTRACT

A hybrid compound for insulating a substrate is formed by dispersing functionalized inorganic nanomaterials in a non-toxic reagent at a controlled pH using volatile bases to form an aqueous dispersion. The aqueous dispersion is then stirred to form the hybrid compound. The compound is then applied to a substrate and dried to from an insulating layer. The insulating layer protects the substrate from temperatures exceeding 1200 degrees Fahrenheit.

20 Claims, 2 Drawing Sheets

(56) References Cited

U.S. PATENT DOCUMENTS

| | | |
|---|---|---|
| 2010/0064614 A1 | 3/2010 | Tsu et al. |
| 2012/0077906 A1 | 3/2012 | Herold et al. |
| 2012/0121888 A1 | 5/2012 | Klett et al. |
| 2012/0256116 A1 | 10/2012 | Albright et al. |
| 2014/0275388 A1 | 9/2014 | Rokowski et al. |
| 2018/0297896 A1 | 10/2018 | Brandt et al. |
| 2019/0256418 A1 | 8/2019 | Riley |
| 2022/0010915 A1 | 1/2022 | Rezende |

FOREIGN PATENT DOCUMENTS

| | | |
|---|---|---|
| CN | 108299979 | 7/2018 |
| CN | 108358588 | 8/2018 |
| CN | 109988467 | 7/2019 |
| CN | 112679223 | 4/2021 |
| CN | 112876140 | 6/2021 |
| EP | 3275307 | 1/2018 |
| EP | 3575374 | 12/2019 |
| EP | 4026876 | 7/2022 |
| JP | WO 2005/019358 | 3/2005 |
| KR | 101005564 | 1/2011 |
| WO | WO 99/67473 | 12/1999 |
| WO | WO 2005/067470 | 7/2005 |
| WO | 2005/097916 A1 | 10/2005 |
| WO | 2010/002934 A2 | 1/2010 |
| WO | WO 2014/144848 | 9/2014 |
| WO | WO 2018/181802 | 10/2018 |
| WO | WO 2018/181803 | 10/2018 |

OTHER PUBLICATIONS

Bossink et al., Demonstrating sustainable energy: A review based model of sustainable energy demonstration projects, Elsevier, Renewable and Sustainable Energy Reviews 77, 2017, pp. 1349-1362, the Netherlands.

Howell et al., Towards the next generation of smart grids: Semantic and holonic multi-agent management of distributed energy resources, Elsevier, Renewable and Sustainable Energy Reviews 77, 2017, pp. 193-214, UK.

Marthe, et al., Enhancement of scattering and reflectance properties of plasma-sprayed alumina coatings by controlling the porosity, HAL archives-ouvertes.fr, https: //hal.archives-ouvertes.fr/hal-00825549, May 24, 2013, pp. 1-19, France.

Ikematsu, Paula, Estudo da refletancia e sua influencia no comportamento termico de tintas refletivas e convencionais de cores correspondentes, Escola Politecnica da Universidade de Sao Paulo Departamento de engenharia de construcao civil. Dec. 2007, pp. 1-134, Brazil.

Ikematsu, Paula, Study of reflectance and its influence on the thermal behavior of reflective inks and matching color conventionals, Politechnical School of the University of San Paulo, Department of Civil Construction Engineering, Dissertation, Dec. 2007, pp. 1-134, Brazil. English translation.

Novo, et al., Fundamentos basicos de emissividade e sua correlacao com os materiais refratarios, conservacao de energia e sustentabilidade, Ceramica 60, 2014, pp. 22-33, Brazil.

Novo et al., Basic fundamentals of emissivity and its correlation with materials refractories, energy conservation and sustainability, Ceramics 60, 2014, pp. 22-33, Brazil. English translation.

Polzin, Friedemann, Mobilizing private finance for low-carbon innovation—A systematic review of barriers and solutions, Elsevier, Renewable and Sustainable Energy Reviews 77, 2017, pp. 525-535, the Netherlands.

Testa, et al., A review of benefits and limitations of static and switchable cool roof systems, Elsevier, Renewable and Sustainable Energy Reviews 77, 2017, pp. 451-460, USA.

Toivanen et al., The emergence of patent races in lignocellulosic biofuels, 2002-2015, Elsevier, Renewable and Sustainable Energy Reviews 77, 2017, pp. 318-326, Sweden.

Xing, Z. et al. "Porous SiO 2 Hollow Spheres as a Solar Reflective Pigment for Coatings", Applied Materials & Interaces, vol. 9, No. 17, pp. 15103-15113, 2017.

International Search Report and Written Opinion for Application No. PCT/US2024/012397, mailed Aug. 19, 2024.

* cited by examiner

HYBRID INSULATING COMPOUND FOR USE IN SYSTEMS REQUIRING HIGH POWER OF THERMAL INSULATION

CROSS REFERENCE TO RELATED APPLICATION

This application claims the benefit of U.S. Provisional Application No. 63/050,969, filed Jul. 13, 2020, the contents of this application is hereby incorporated by reference in its entirety.

BACKGROUND OF THE INVENTION

The present invention is directed to a hybrid insulating compound, and more particularly, a hybrid insulation compound for use in a system requiring highly effective insulation in extreme temperature conditions.

Thermal insulation material is known in the art and typically is considered to be material that has the ability to delay and/or hinder the propagation of thermal energy between two or more bodies, considering that according to the physical laws of heat propagation, the sum of the amounts of heat exchanged must be null based on the zero principle of thermodynamics. Heat exchange occurs spontaneously until the bodies involved in an "isolated system" reach thermal equilibrium and, consequently, are at the same temperature.

The most common and low-cost insulators are rock wool, and glass wool, both having a mineral origin. Rock wool is a thermal insulator of mineral origin produced from a volcanic rock, the diabase, by fusion, and is an incombustible material that is completely permeable to air and water vapor, however, it does not absorb water. In addition, rock wool is characterized by high compressibility, but, nevertheless, it has a low resistance to cutting. Due to these factors, rock wool is usually ordered prefabricated by industries and companies that use the product, and is packaged in the form of rolls and panels.

To use rock wool it is recommended that one avoids direct contact with the material, as well as avoid contact with air in closed housing environments, creating the need for appropriate personal protective equipment. The technical parameters of rock wool include a density 20 to 150 kg/m$^3$, thermal conductivity of 0.037 W/m·° C., insulation performance at maximum operating temperatures between 150 and 250° C., non-combustible, according to the ISO 1182 method, where the blankets withstand temperatures up to 750° C. in continuous use and temperature peaks of maximum 1,000° C.

Glass wool is a material composed essentially of sand and pieces of recycled glass, obtained by extruding these molten minerals. Glass wool provides a passive reaction to fire, has good water resistance for a short period, however, when subjected to high humidity, glass wool's performance is below expectations. The durability of glass wool for optimal performance is ten years and can be stored in different ways, from panels to rolls. The material's main thermal characteristics are: density 13 to 100 kg/m$^3$, thermal conductivity of 0.034-0.045 W/m·° C. and withstands temperatures up to 450° C. (resin products) and 550° C. (resin-free products).

Synthetic thermal insulators, with special emphasis on materials based on silica aerogels, are still little used in place of mineral wools. Silica aerogels are highly porous materials prepared by a sol-gel process and dried under supercritical conditions. In aerogels ninety-nine percent (99%) of the volume is formed by empty spaces with an average density of up to 0.01 g/cc, much lower than conventional silica glasses (2.2 g/cc).

Due to the composition being formed by silica nanoparticles, silicon oxide, the material forms a solid structure of extremely low density but possesses strong insulation properties. The flexible blanket made of aerogel has high thermal performance, in addition to having a low thickness required for application and has high flexibility for installation; which usually presents characteristics favorable to environments subject to high humidity.

The primary interest regarding the use of aerogel, especially silica aerogel, are its unusual properties when compared to the thermal insulators. Aerogel properties include micro porosity and thermal conductivity. Although these are different properties, they are directly related. The micro porosity, that is, the small diameters of the cavities vary from micro pores (2 mm in diameter) to macropores (greater than 50 mm in diameter). However, the material is composed mostly of mesopores (2 mm up to 50 mm in diameter). Thus, an aspect developed by aerogel is its open nature of interconnectivity, which allows gas to pass through the material. Due to this same porosity and pore size, the silica aerogel is a material that has a very low thermal conductivity. This conductivity value is of the order of 0.02 W/m·K at room temperature and constant air pressure.

For commercial applications, the most popular silica aerogel technology is the flexible blanket. From the development of the silica aerogel, a North American company in partnership with a Scotswoman developed a flexible aerogel blanket, which in addition to incorporating the original aerogel, has flexible fibers added to its constitution, allowing the blanket to obtain thermal insulation with high performance and easy installation. The technical specifications for more specific evaluation of the flexible aerogel blanket include thicknesses from 0.20 in (5 mm) to 0.40 in (10 mm), shape of the material in 140 m$^2$ rolls and rolls 80 m$^2$, maximum usage temperature of 1200° F. (650° C.), Density 12.5 lb/ft$^3$ (0.20 g/cc), hydrophobic, compression resistance>40.7 kPa at 10% deformation, water vapor absorption <5% (according to weight), fungal resistance of non-growing insulation materials, surface burning (ASTM E84) and spreading index: <5 (fireproofing). In addition, the material has high resistance to extreme temperature variations, up to 200° C. and up to 650° C. for fire protection applications.

The thermal conductivity of the aerogel blanket increases approximately exponentially with the increase in the temperature of the surface in contact. Observed is that thermal conductivity is present in the order of 0.013 W/m·K at a temperature of 0° C., however there is a thermal conductivity that reaches 0.023 W/m·K at a temperature of 260° C.

Thermal inks/paints are the latest commercially available materials. Thermal paints are a ceramic and silica composite that provides thermal insulation to the surfaces on which they are applied. Due to being a water-based acrylic paint, they have excellent adhesion to the surfaces where applied, offering protection against corrosion under insulation, as the material does not allow the creation of an environment with humidity and oxygen in contact with the surface in question.

Thermal paints can be applied to the most varied equipment such as pipes, valves, tanks, filters, heat exchangers, processors and boilers during the operation, since their application occurs through blasting, a process in which a gun of paint sprays, at high pressure, the thermal paint on the surface to be insulated.

Intumescent materials are, in general, used to protect metal and wood structures, in addition to plastic and fabric substrates. Intumescent paints are chemical compounds that, when subjected to high temperatures, undergo various reactions that originate a carbonized foam with strong insulation performance, this material being consumed by fire and may be called sacrificial material.

Intumescent paints are heat-reactive products, which, at approximately 200° C., begin a process of volumetric expansion, often reaching their initial volume, depending on the applied thickness and temperature to which they are exposed. In this process, non-toxic gases are released that act together with special resins forming a rigid "foam" on the surface of the structure, causing the delay in the rise of temperatures in the metal elements, preventing the profile from collapsing.

This type of material requires that the correct surface preparation has been made according to the use or location of the building, the application of primers or funds compatible with this use (and according to the manufacturers' information), application of the correct thickness defined both for the protection time and for the type of profile and finally, and after the drying of the intumescent paint, finishing paints are applied that allow the desired aesthetic aspect (color and brightness pattern) and long-term protection for intumescent paints.

Intumescent paints are the products with the best aesthetic finish for the protection of metal structures, however they are materials of higher costs and with longer application times (depending on thicknesses to be applied), and must be used with caution to ensure the economic viability of any enterprise. The material is usually applied with the help of a gun or brush and with variable thicknesses, between 500 μm and 1000 μm, depending on the mass of the materials to be protected and the critical temperature defined.

Although current formulations of intumescent paints can provide adequate fire resistance, they still have some weaknesses, such as: (i) the water solubility of some of their ingredients, makes them less efficient in environments with high moisture content; (ii) the cost of the raw material and (iii) the cost of its application limits use of the material, and (iv) the loss of intumescence properties and the consequent loss of thermal resistance with time in service (aging). The intumescent paints remain unchanged up to 200° C., at this temperature it starts a series of reactions, which generates passive protection against fires.

The proper thickness of intumescent paint is given by the analysis of the type of material that will be protected, its structure—which can be classified as light, medium and heavy—and by the use of construction—whether it is industrial, commercial or institutional. Thus, intumescent paint protects the environment according to your needs, where the fire resistance varies from 30 to 120 minutes at a maximum temperature of 1,000° C.

While useful, there still exists a need in the art for a material that improves upon the problems and limitations of existing materials.

An objective of the present invention is to provide a hybrid insulating compound that protects a substrate from extreme temperatures.

Another objective of the present invention is to provide a hybrid insulating compound that is more durable and eliminates the need for personal protective equipment.

These and other objectives will be apparent to those skilled in the art based upon the following written description, drawings, and claims.

SUMMARY OF THE INVENTION

A hybrid compound for insulating a substrate is formed by dispersing functionalized inorganic materials in a non-toxic reagent at a controlled pH using volatile bases to form an aqueous dispersion. The aqueous dispersion is then stirred either with a high-speed mechanical stirring device or an ultrasonic material stirring device to form a compound. The compound is than applied to the substrate and then dried to form an insulating layer.

The dimensions of the functionalized inorganic nanomaterials preferably are between 10 nm to 12 mm and the controlled pH is preferably between 7 and 12. The layer of insulation has many characteristics with one being that it protects the substrate from temperatures exceeding 1200 degrees Fahrenheit. The compound also has an emissivity of between 0.90 and 0.95.

DETAILED DESCRIPTION OF THE PREFERRED EMBODIMENTS

Figure 1:
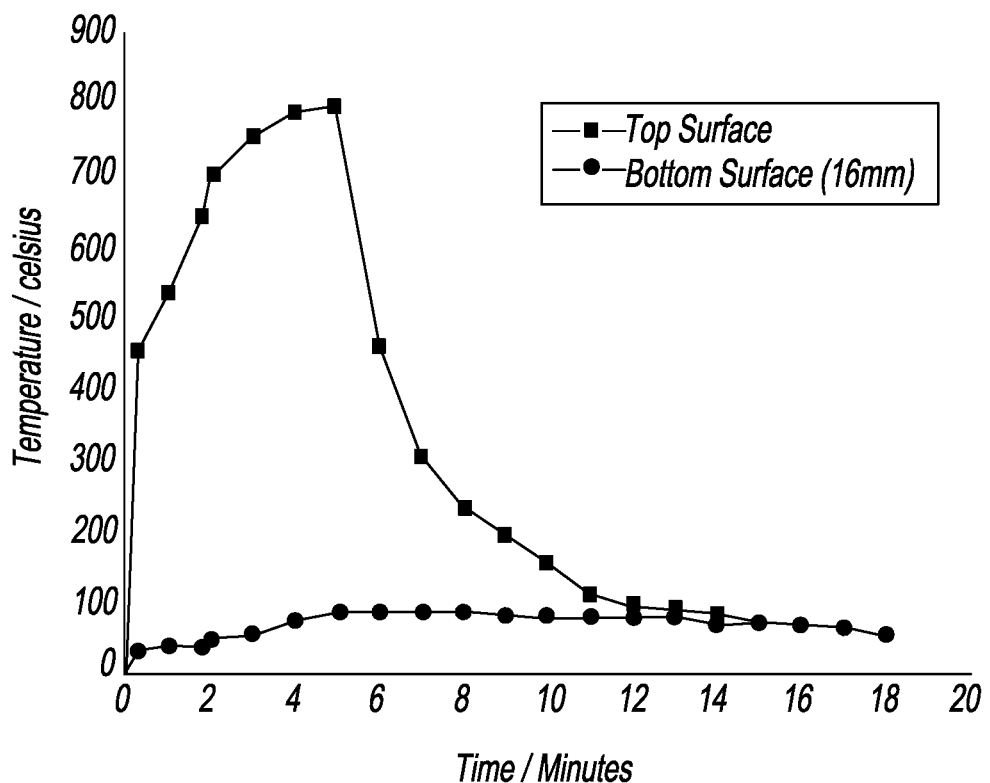
FIG. 1 is a chart showing the heating and cooling of a hybrid compound over time and under direct heat.

Referring to the Figures, a hybrid insulating compound 10 is formed by dispersing functionalized inorganic nanomaterials in a non-toxic reagent at a controlled pH using volatile bases with the aid of high-speed mechanical stirring in conjunction with ultrasonic mechanical stirring. The aqueous dispersion includes different types of solid insulating particles, fibers solvents or other media for dispersion, additives, and water, where the dimensions of the constituents are between 10 nm to 12 mm. Preferably, the inorganic materials have high heat resistance, good mechanical resistance, and low electrical and thermal conductivity. The compound is formed based upon a reaction between commercial and non-commercial materials of different sizes forming a dispersion of nanomaterials, in water with a controlled pH, preferably between 7.0 and 12, through the use of a mechanical, ultrasonic agitation tip and/or bath and mechanical agitation with propeller in high rotation.

Preferably, the dispersion technique used includes the mechanical stirring of the suspension, which is carried out by a magnetic stirrer or with the aid of blades. Also, steps are taken to promote the dispersion of nanomaterials in the aqueous medium which include pH control, viscosity and mechanical agitation at medium and high speed, and use of a surfactant or ultrasonic waves.

Due to the nanometric scale of the materials used in the compound, there is a physical-chemical interaction between the nanomaterials due to the high surface area and their chemical affinity. Due to its nanometric scale the liquid medium tends to agglomerate. This is because in general the forces of interaction between these nanomaterials are greater than the force of interaction with the solvent.

In one example, the hybrid insulating compound 10 includes a mixture of a dispersion of amorphous silica in mass content of 5 to 50%, insulating particle of 2 to 60%, dispersion of silica of 5 to 40%, inert pigment 1 to 10%, additives 3 to 20% and water from 20 to 60% by weight. The dispersion of amorphous silica gives the system strength and hardness of the formed material network. In another example, the hybrid insulating compound 10 has a solid content of 20% to 90%, and the solid has a particle diameter of 10 nm to 1000 nm.

When applied on an appropriate substrate, the compound forms an insulating material having a solid structure, due to water evaporation. In one example the insulating material becomes a solid film given evaporation of the volatile component and/or the chemical reaction for the purpose of photo and thermal protection. The insulating material is formed by means of reaction between the constituents of the dispersion, and after curing the material presents low dimensional variation and can be used in a hybrid compound for insulating a substrate is formed by dispersing functionalized inorganic nanomaterials in a non-toxic reagent at a controlled pH using volatile bases to form an aqueous dispersion. The aqueous dispersion is then stirred to form the hybrid compound. The compound is then applied to a substrate and dried to form an insulating layer. The insulating layer protects the substrate from temperatures exceeding 1200 degrees Fahrenheit.

The curing or sintering takes place without the need of external energy, with low dimensional variation for fireproofing and/or thermal insulation applications, in systems that require maximum performance and complex protection geometries. The product after curing has low thermal conductivity associated with high surface reflectivity and low density, and low VOC, as the solvent used is water. After curing, the insulating material can be crushed and used as an insulating filler in several types of systems and materials, such as polymers, metals, ceramics and/or products and processes in order to increase resistance to thermal and electrical flow.

The insulating material can be applied as a conventional paint using a spray system, airless, manual, projection equipment, or the like to form a uniform finishing layer of protective coating with excellent flame retardancy, thermal insulating, and anti-corrosion properties. The insulating material is applied and used pure or through dispersion and incorporation into other systems, for use in several areas, such as incorporation into a polymeric, ceramic, metallic matric and laminated materials. The insulating material, in one example, is applied as conventional paint, which is used as a protective coating for thermal flow under extreme conditions of use. When applied in the form of a primer, whether pure or dispersed in a polymer, the insulating material has excellent adhesion to the substrate (ceramic, metallic and polymeric), hardness, abrasion resistance, corrosion resistance, and a good finish.

The agent containing the suspension of nanomaterials has applications in chemistry, engineering, biomedicine and electronics, as a raw material in processes of deposition of nanomaterials superficially by the methods of manual painting, spray painting and spray, by immersion of a substrate in the suspension, or by direct or indirect mixing in solid or liquid substrate.

Application of the compound is used in several areas, such as electronics, energy efficiency, thermal insulation, fire breakers, sensors, super-efficient filters, civil, aerospace, aeronautical, nautical, sports, etc. In most cases, the use of these nanomaterials is carried out by promoting their dispersion in an aqueous reagent, forming a suspension of the nanomaterials.

The hybrid compound works efficiently in the transference phenomena by conduction, convection and radiation. Combining these three phenomena in the same product, a high efficiency in thermal insulation occurs, above the commercial materials currently available on the market.

Heat transfer occurs due to the temperature difference between two bodies and can occur in three different ways: conduction, convection and radiation. The first mode will occur theoretically in a stationary medium, in solids or fluids, the second will occur between a surface and a fluid in motion and finally the third mode will be through electromagnetic waves emitted by surfaces at a non-zero temperature.

One way to evaluate the efficiency of an insulator is to measure its thermal conductivity (K), which refers to the amount of heat that is transferred in a solid at a certain temperature. The efficiency also depends on the type of bond, packaging and atomic arrangements. Thermal conductivity is of great importance in this work because it characterizes the ability of a material to transfer heat.

The transfer of heat by conduction occurs by two distinct mechanisms due to the existence of free electrons, which is why metals are excellent conductors and due to the vibration of the crystalline network, phonemes. The Nano Shield family was designed so that the connections between the species that form the coating are covalent, there are no free electrons, so it will be structurally an insulator. In addition, the symmetry of the solid formed was broken, which further complicates the conducting, material and amorphous phenomenon.

In the case of heat transfer by radiation, the material was designed to have high reflectance and emissivity, so when the radiated heat interacts with the product surface, it has a re-emitted part, which reduces the surface temperature of the coating. These characteristics associated with its low density provide a very high cooling rate. In some cases, in 12 minutes the coating has a temperature close to room, FIG. 1.

The reflectivity, emissivity and absorptivity values of a material are factors that determine the efficiency of its thermal insulation power. Electromagnetic radiation from a heated body may have part of its intensity absorbed (Ia), transmitted (It) or reflected (Ir) when interaction with a solid occurs. These components can be transformed into absorbency (A), transmissivity (T) and reflectivity (R), these will always be present in the process of interaction of radiation with matter and that is why they were worked on in the development of the thermal insulation.

More reflective materials will have greater 'cooling' power, and their surfaces will have a lower temperature when compared to non-reflective materials. The hybrid compound provides high values of reflectivity and emissivity and small values of absorptivity, these factors improve its efficiency in relation to thermal insulation.

Temperature reduction effects due to reflectivity are due to surface characteristics (roughness and porosity). On very rough surfaces, incident waves can be reflected more than once, increasing the probability of energy absorption.

The relationship between porosity, pore size and distribution is very important. Surfaces with pores of larger diameters reflect better radiation at longer wavelengths, while smaller pores improve reflectivity at shorter wavelengths. This decrease in temperature due to the increase in porosity can be explained by Mie's theory (pores of larger sizes, do not spread radiation of shorter lengths efficiently).

Due to the existence of nanoparticles in its formulation, the hybrid compound, when cured, presents porosity in a size range ranging from nano to mesopore, this pore size distribution allows the product to be able to reflect ultraviolet to infrared length radiation. This wide range of reflectivity helps to lower the temperature of the insulator under extreme heat conditions, contributing to a more efficient spread of radiation.

It is also possible to achieve a reduction in the surface temperature of the insulator using a specific compound, for example; titanium dioxide, which is a semi-conductor, which reflects more light, improving the reflectivity of the surface.

The reduction in surface temperature is increased due to the use of compounds such as titanium oxide, magnesium oxide, aluminum-cobalt (CoAl), iron-chromium (FeCr), nickel-antimony-titanium (Ni—Sb—Ti) and carbides, which can enter the composition of the compound through a specific use. The use of these additives improves the reflection of radiation by reducing the temperature.

The absorbed radiation intensity (Ia) can be used part to increase the temperature of the material and part can be irradiated to the environment, this part irradiated again consists of the emissivity of the material. In materials that have surfaces (solids and liquids), the emissivity value as well as the other radiative properties depend on the surface roughness, the temperature, the wavelength and the angle of the incident radiation.

Materials with high emissivity (ability to emit heat) promote radiative cooling. Metallic materials have low emissivity and the application of coating with higher emissivity values increases the emissivity of the surface.

In one example, the hybrid compound has a high emissivity, between 0.90 to 0.95, which favors, together with its low density, the radioactive cooling of material, and tests show that the insulator, conditioned at 1200° C., cools to 60° C. in approximately 12 minutes, FIG. 1.

Due to factors presented as high reflectivity and emissivity values, low absorptivity and density, nano and meso porosity. Under a direct propane flame, 1,200° C., the Nano Shield surface is at 790° C., FIG. 1. The hybrid compound, after curing has low thermal conductivity associated with high surface reflectivity and reduced density. Low VOC, as the solvent used is water.

All coatings of the hybrid compound family have low density, the density of the dry product is between 0.35 and 0.50 g·cm-3. The low weight of the material after curing helps in the efficiency of thermal insulation and in the reduction weight on the structure that the material was applied to.

Based on the energy efficiency proposals, the hybrid compound satisfies the prerequisites: they are composed of nano charge and cold sintering. They have low dimensional variation after curing and have been developed for fire break and thermal insulation applications in systems that require maximum performance without the geometric limitations of commercial insulators.

The hybrid compound can be used in projects and/or equipment that operate between the temperature range of 200 to 2100° C. continuously. However, the great highlight of the hybrid compound and its use is at temperatures above 1,200° C., where currently there are no commercial products that satisfy the conditions of performance, application and durability.

The hybrid compound can resist direct and radiated flame at temperatures above 1400° C. and can be heated and cooled immediately using water without cracking. In tests performed, the K factor of the coatings applied directly under a substrate was measured, the data was collected and the test conditions found: coating thickness 16 mm, temperature of the hot face 1200° C., ambient temperature 22.6° C., and direct flame propane under the coating surface. The data found indicated that the best performing coating had a K of 0.017 W/mK and the worst performing of 0.035 W/mK at a temperature of 1200° C.

Under a direct flame of 1200° C., a 16 mm thick sample showed a surface temperature of 793° C. and a cold face temperature of 79° C. After removing the sample from the heat and 12 minutes later, the surface temperature of the coating was 57° C.

The hybrid compound has different compositions according to the application and the temperature of use, and in one example is composed of a mixture of a dispersion of amorphous silica in mass levels of 5 to 50%, insulating nanoparticles of 2 to 60%, spheres of micro silica from 5 to 40%, fused silica from 5 to 50%, bentonite 1 to 5%, inert pigment from 1 to 10%, additives 3 to 20%, inorganic semiconductors 2 to 30%, carbides from 5 to 35%, inorganic fibers 5 to 40%, polymeric resin from 5 to 60% and water from 20 to 60% by weight.

The dispersions of silica and amorphous silica give the system strength and hardness of the formed material network and resistance to high temperatures and thermal shock. Inorganic fibers give the product resistance to traction and flexion.

The increase in reflectance and emissivity are achieved by nature itself in the insulating nano charge, the silica charges, inorganic semiconductors and the carbides. The semiconductors used, three are of commercial origin: titanium oxide, magnesium oxide and chromite, the others (aluminum-cobalt (CoAl), iron-chromium (FeCr), nickel-antimony-titanium (Ni—Sb—Ti)).

The inorganic fibers used are those of glass, aramid, carbon and mixed carbon and aramid, are from commercial sources. In some applications they are functionalized and doped with graphene and nanotubes.

Electro fused silica and bentonite are used as thickeners and binders for the hybrid compound dispersion for the production of the insulating product after water evaporation. Modifiers of rheological properties such as inert pigments and additives of commercial origin. Polymeric resins are used as an agent of plasticity, tackiness and binder, all commercial water-based or not, such as acrylic, alchemical, epoxy, polyurethane resins, Phenol-formaldehyde, polyurethane, furfural resin, poly acrylonitrile, polyimide, sucrose and tannin.

The formulations to produce the insulating nano-charge are described in general, with the composition of an insulating nanoparticle in the content of 2 to 60% by mass, micro-silica spheres in the content of 5 to 40% by mass, inorganic fibers in the content of 5 to 40% by mass, sodium bentonite in the content of 1 to 5% by mass, and water in the content of 5 to 50% by mass. The dispersion is left to stand for the formation reactions of the new insulator and then heat treated to adjust its thermal and mechanical properties.

The prepared material can be used directly on the substrate or incorporated into a media vehicle, as in the example below the vehicle is a polymer. Example 1: formulation of a hybrid polymer nano-charge system. The insulating particle, solidified and treated, must be crushed to the appropriate granulometry for its use. After crushing the Nano Shield will be incorporated into the polymer in the content of 2 to 80% by mass, in this formulation the inert pigments will enter the composition of the insulator, the content of 1 to 10% by mass, inorganic semiconductors in the content of 2 to 30% by mass and carbides in the content of 5 to 35%.

Figure 2:
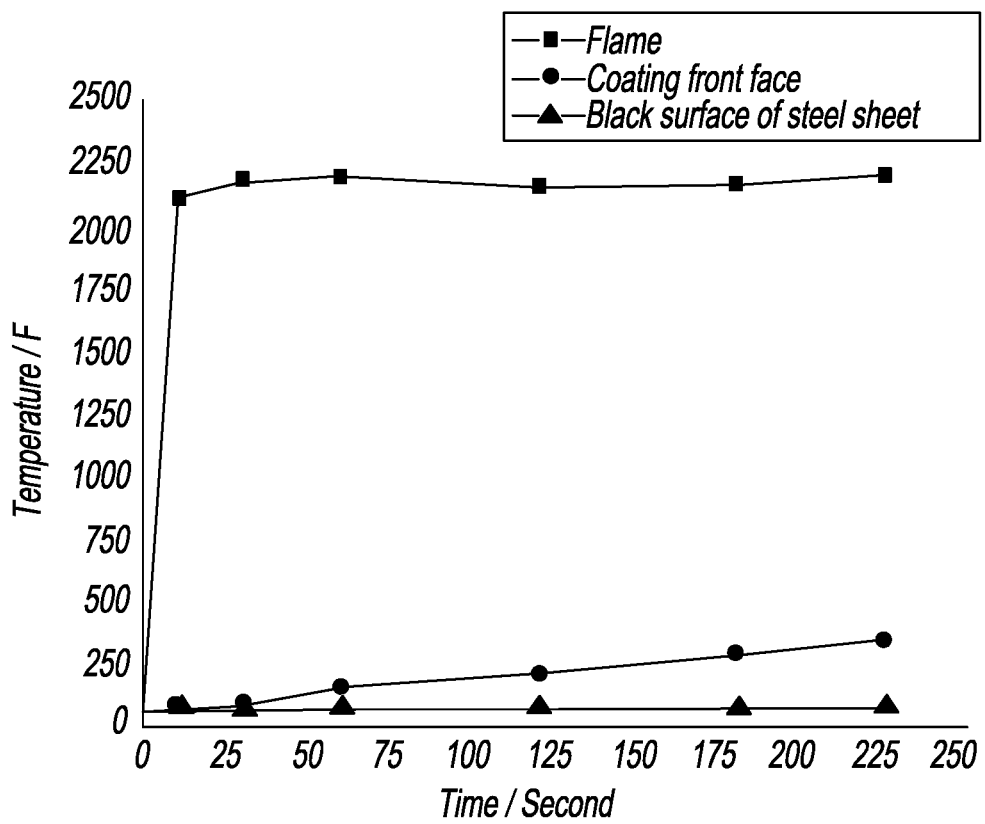
FIG. 2 is a chart showing the thermal efficiency of a hybrid insulating compound over time.

In the formulation presented above the thermal properties determined were: the fire exposure lasted about 3 minutes 45 seconds before it was terminated. As shown in the summary table and chart below, the temperature on the front surface of the coating layer gradually increased from 73.5° F. (23° C.) to about 342° F. (172° C.) stayed at about 72 to 73° F., while the flame temperature as recorded through the TC in front of coating surface jumped to over 2000° F. (1100° C.) in about 11 seconds and maintained at that level for the rest test time. The temperature on the back face of the steel sheet remained at between 72 to 73° F. (22° C. to 23° C.). It was estimated that the coating thickness at the center of the fire exposure was in the range of 2 to 5 mm, FIG. 2.

Example 2

Formulation of a hybrid polymer-nano charge system. The insulating particle, solidified and treated, must be crushed to the appropriate granulometry for its use. After crushing, the inert pigments will be incorporated into the polymer in the content of 10 to 60% by mass, in this formulation the inert pigments will enter the content, from 1 to 10% by mass, additives in the content of 3 to 20% by mass, inorganic semiconductors, in the content of 2 to 20% by mass, silica electro-fused in the content of 5 to 50% and inorganic fibers in the range of 5 to 30% by mass.

Example 3

Formulation of a hybrid polymer nano-charge system. The insulating particle, solidified and treated, must be crushed to the appropriate granulometry for its use. After being crushed, it will be incorporated into a mixture containing inert pigments, the content of 1 to 10% by weight, inorganic semiconductors in the content of 2 to 15% by weight, electro-cast fused silica in the content of 5 to 35%, inorganic fibers in the range of 5 to 30% by mass and water in range of 30 to 50% by mass.

Example 4

Formulation of a hybrid system. The insulating particle, solidified and heat treated, must be crushed to the appropriate granulometry for its use. After crushing, the Nano Shield will be incorporated into a mixture containing inert pigments, the content of 1 to 10% by mass, inorganic semiconductors in the content of 2 to 15% by mass, silica fused in the content of 5 to 35%, inorganic fibers in the range of 5 to 30% by mass, bentonite in the content of 2 to 4% by mass and water in range of 30 to 50% by mass.

Example 5

Formulation of a hybrid system. The insulating particle, solidified and thermally treated, must be crushed in the appropriate granulometry for its use and incorporated into a mixture containing inert pigments, content from 1 to 8% by mass, inorganic semiconductors in the content from 2 to 20% by mass, fused silica in the content of 5 to 30%, inorganic fibers in the range of 5 to 27% by mass, amorphous silica in the mass content of 5 to 20% by mass, bentonite in the content of 1 to 5% by mass and water in the range of 30 to 30% 50% by mass.

Example 6

Formulation of a hybrid system formed by an insulating particle, solidified and heat treated, must be crushed in the appropriate granulometry for its use and incorporated in a mixture containing inorganic semiconductors in the content of 2 to 23% by mass, electro-cast fused silica. 5 to 31%, inorganic fibers in the range of 5 to 21% by mass, amorphous silica in the mass content of 5 to 23% by mass, bentonite in the content of 1 to 4% by mass and water in the range of 20 to 60% by mass.

Example 7

Formulation of a hybrid system formed by an insulating particle, solidified and heat treated, it must be crushed in the particle size suitable for its use and incorporated into a mixture containing inorganic semiconductors in the content of 2 to 23% by weight, micro-silica spheres in the content from 5 to 33%, inorganic fibers in the range of 5 to 21% by weight, amorphous silica in the mass content of 5 to 23% by weight, bentonite in the content of 1 to 4% by weight, carbides in the content of 5 to 15% and water in the range of 20 to 60% by mass.

Example 8

Formulation of a hybrid system formed by an insulating particle, solidified and heat treated, it must be crushed in the appropriate granulometry for its use and incorporated in a mixture containing inorganic semiconductors in the content of 2 to 23% by mass, micro-silica spheres in the content from 5 to 33%, inorganic fibers in the range of 5 to 21% by weight, amorphous silica in the mass content of 5 to 23% by weight, bentonite in the content of 1 to 4% by weight, fused silica from the content of 5 to 30% in mass, carbides in the content of 5 to 15% and water in the range of 20 to 60% by mass.

Example 9

Formulation of a polymer nano-charge hybrid system. The insulating particle, solidified and treated, must be crushed to the appropriate granulometry for its use. After crushed it will be incorporated to the polymer in the content of 10 to 60% by mass, in this formulation the inert pigments will enter the composition of the insulator, the content of 1 to 10% by mass, additives in the content of 3 to 20% by mass, semiconductors inorganic content of 2 to 20% by weight.

This document claims the production and use of an insulator composed of a mixture of a dispersion of amorphous silica in mass levels of 5 to 50%, insulating nanoparticles of 2 to 60%, spheres of micro silica from 5 to 40%, fused silica from 5 to 50%, bentonite 1 to 5%, inert pigment from 1 to 10%, additives 3 to 20%, inorganic semiconductors 2 to 30%, carbides from 5 to 35%, inorganic fibers 5 to 40%, polymeric resin from 5 to 60% and water from 20 to 60% by weight. For the formulation of a hybrid compound with insulation characteristics and high thermal performance.

The use of this new hybrid insulator applied directly on the surface to be isolated or dispersed in polymeric matrices, composites, in inorganic materials such as plaster, concrete, mortar, etc. and metal alloys. To be used in insulation, anti-flame and fire-fighting systems.

The use of this insulator in a formulation involving polymeric materials, be it 100% solid or diluted and/or in aqueous dispersions for use in fire and insulation systems. Which may or may not be applied as a conventional paint using a spray system, airless, manual, projection equipment, or the like to form a uniform finishing layer of protective coating with excellent flame retardance, thermal insulation, and anti-corrosion properties.

The use of commercial insulating fillers in formulations like those presented in the description of the materials. Especially when incorporated into polymeric matrices such as all commercial water-based or not, such as acrylic, alchemical, epoxy, polyurethane resins, Phenol-formaldehyde, polyurethane, furfural resin, poly acrylonitrile, polyimide, sucrose and tannin.

From the above discussion and accompanying figures and claims it will be appreciated that the compound 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A composition of matter comprising:
   a hybrid insulation compound comprising, by mass:
      2 to 60% inorganic particles;
      5 to 40% spheres of micro silica; and
      5 to 50% water,
   wherein the inorganic particles have a diameter within a range of 10 to 1000 nanometers.

2. The composition of matter of claim 1, wherein the hybrid insulation compound further comprises 1 to 5% bentonite by mass.

3. The composition of matter of claim 1, wherein the hybrid insulation compound further comprises inorganic semiconductors and inert pigments, wherein the inorganic semiconductors include at least one selected from the group consisting of: titanium dioxide, titatium oxide, magnesium oxide, chromite, aluminum-cobalt, iron-chromium, and nickel-antimony-titanium.

4. The composition of matter of claim 3, further comprising a polymer, wherein the polymer is 20 to 98% by mass of the composition of matter, wherein the hybrid insulation compound further comprises, by mass:
   1 to 10% inert pigments;
   2 to 30% inorganic semiconductors; and
   5 to 35% carbides.

5. The composition of matter of claim 3, further comprising a polymer, wherein the polymer is 40 to 90% by mass of the composition of matter, and wherein the hybrid insulation compound further comprises, by mass:
   1 to 10% inert pigments;
   3 to 20% additives;
   2 to 20% inorganic semiconductors; and
   5 to 50% electro-fused silica.

6. The composition of matter of claim 3, further comprising a polymer, wherein the water is 30 to 50% by mass of the hybrid insulation compound, and wherein the hybrid insulation compound further comprises, by mass:
   1 to 10% inert pigments;
   2 to 15% inorganic semiconductors; and
   5 to 35% electro-fused silica.

7. The composition of matter of claim 3, wherein the water is 30 to 50% by mass of the hybrid insulation compound, and wherein the hybrid insulation compound further comprises, by mass:
   2 to 4% bentonite;
   1 to 10% inert pigments;
   2 to 15% inorganic semiconductors; and
   5 to 35% electro-fused silica.

8. The composition of matter of claim 3, wherein the water is 30 to 50% by mass of the hybrid insulation compound, and wherein the hybrid insulation compound further comprises, by mass:
   2 to 4% bentonite;
   1 to 8% inert pigments;
   2 to 15% inorganic semiconductors; and
   5 to 35% electro-fused silica.

9. The composition of matter of claim 3, further comprising a polymer, wherein the polymer is 40 to 90% by mass of the composition of matter, and wherein the hybrid insulation compound further comprises, by mass:
   1 to 10% inert pigments;
   3 to 20% additives; and
   2 to 20% inorganic semiconductors.

10. The composition of matter of claim 1, wherein the hybrid insulation compound has a pore size such that the hybrid insulation compound reflects radiation with a wavelength in the range of ultraviolet to infrared.

11. The composition of matter of claim 1, wherein the hybrid insulation compound is insulating when exposed to a temperature within a range of 1200 to 2100 degrees Celsius.

12. The composition of matter of claim 1, wherein the hybrid insulation compound has an emissivity of at least 0.90.

13. The composition of matter of claim 1, wherein the hybrid insulation compound has an emissivity within a range of 0.90 to 0.95.

14. The composition of matter of claim 1, wherein the hybrid insulation compound is dispersed in at least one of the group consisting of: plaster, concrete, mortar, a metal, a polymer, a resin, and a paint.

15. A method of forming an insulating layer on a substrate, the method comprising:
   applying, in aqueous form, the composition of matter of claim 1 to the substrate; and
   drying the applied composition of matter.

16. The method of claim 15, wherein the dried composition of matter is a solid film.

17. The method of claim 15, further comprising forming the hybrid insulation compound of the composition of matter by dispersing the inorganic particles, spheres of micro silica, and inorganic fibers in the water via mechanical stirring.

18. A composition of matter comprising, by mass:
   2 to 60% inorganic particles;
   5 to 40% micro silica; and
   1 to 5% bentonite or 5 to 50% electro-fused silica.

19. The composition of matter of claim 18, further comprising, by mass:
   2 to 30% inorganic semiconductors; and
   5 to 35% carbides.

20. The composition of matter of claim 18, wherein the composition of matter has an emissivity of at least 0.90.

* * * * *